United States Patent [19]

Tsujimoto

[11] Patent Number: 5,321,452
[45] Date of Patent: Jun. 14, 1994

[54] MAGNETIC HEAD FOR A CAMERA FEATURING MULTIPLE, VARIED-SIZED HEAD PORTIONS

[75] Inventor: Shinichi Tsujimoto, Tokyo, Japan

[73] Assignee: Canon Kabushiki Kaisha, Tokyo, Japan

[21] Appl. No.: 871,997

[22] Filed: Apr. 22, 1992

[30] Foreign Application Priority Data

Apr. 26, 1991 [JP] Japan ................................ 3-122997

[51] Int. Cl.$^5$ ............................................ G03B 17/24
[52] U.S. Cl. ................................................... 354/106
[58] Field of Search ............... 360/110, 118, 119, 122; 354/76, 105, 106

[56] References Cited

U.S. PATENT DOCUMENTS

4,933,780  6/1990  Wash et al. .............................. 360/1
5,097,372  3/1992  Fukazawa et al. .................... 360/113

Primary Examiner—David M. Gray
Attorney, Agent, or Firm—Fitzpatrick, Cella, Harper & Scinto

[57] ABSTRACT

A magnetic head for a camera for use with a film with a magnetic memory portion, includes a first head portion for writing information to the magnetic memory portion of the film, and a second head portion for at least reading information from the magnetic memory portion of the film, wherein a length of the second head portion in the perpendicular direction to a film transporting direction is longer than a length of the first head portion in the perpendicular direction to the film transporting direction.

112 Claims, 5 Drawing Sheets

MAGNETIC HEAD FOR A CAMERA FEATURING MULTIPLE, VARIED-SIZED HEAD PORTIONS

BACKGROUND OF THE INVENTION

1. Field of the Invention

The present invention relates to a camera for use with a film having a magnetic memory portion. More specifically, the present invention pertains to an improvement in a magnetic head of such a camera, for writing or reading to or from the magnetic memory portion of the film.

2. Description of the Related Art

U.S. Pat. No. 4,977,419 discloses a type of photographic film (simply referred to as "film" below) having a transparent magnetic layer on the side of the film base, and discloses a type of camera having a magnetic head for writing or reading information to or from the aforementioned magnetic layer of the film.

The '419 patent also discloses a plurality of recording tracks for magnetically recording that are provided outside a photographic frame of the film. This is because it is intended that increasing the number of the recording tracks increases an amount of information that can be recorded for each frame.

The kinds of information recordable by the camera, include a date and a time of a photographing operation, the kind of illuminating light source at the time of the photographing operation, pseudo-zoom information and photographic information pertaining to a shutter time, an aperture value, etc.

U.S. Pat. No. 4,878,075 discloses a type of film wherein film information pertaining to the film speed, the specified number of photographic frames, etc. is previously-recorded, and also discloses a type of camera which reads this information from the film before a photographing operation and rewrites this information during a film winding operation after the photographing operation, to record various kinds of photographic information at the time of the photographing operation on the film.

The '075 patent discloses that the camera writes "exposed information" indicating an exposure operation has been completed, to every photographic frame which has been exposed, as a part of the photographing information. (The term "exposed information" pertains to information relating to the exposure of a previously exposed photographic frame.) Moreover, the '075 patent discloses that the film is rewound halfway through use and removed from the camera. When the rewound film is reloaded into the same camera or loaded into another camera, a magnetic head of the camera detects whether there is the exposed information with respect to each photographic frame of the film, and enables an exposure operation to automatically resume from an unexposed frame of the film. (This is referred to as "auto-set function at the time of reloading the film.") That is, this is realized by means of the camera reading the photographic information, which the same camera or another has written, from the rewound film when the film is reloaded into the same camera or loaded into a different camera.

Now, in order to read the film information previously-recorded on the magnetic layer on the side of the film base, or in order to write the photographic information to the magnetic layer of the film in response to the photographing operation by means of the magnetic head, which is arranged in the camera, it is necessary to transport the film in a state where the magnetic head (especially a track forming portion thereof) is in close contact with the aforementioned magnetic layer of the film. For this reason, the camera is usually arranged in such a manner that the film is held under a urging force between the magnetic head positioned on the side of the base of the film and a pad positioned at a location to face the magnetic head on the emulsion layer side of the film. As a result, the film suffers scrapes and pressure marks caused by the pressure of holding the film between the magnetic head and the pad. Therefore, the camera should read the film information from and should write the photographic information to an area of the film excluding the photographic frame.

On the other hand, the magnetic layer may be provided on the side of the film base, all over the film base, as disclosed in the '419 patent. For this reason, in order to prevent the image quality of a photograph from deteriorating owing to the presence of the magnetic layer, the number of magnetic particles, i.e., the density, provided for the magnetic layer is limited to be a very small number. Therefore, a signal output obtained when the camera reads the film information is very small. Moreover, the camera has an electromagnetic noise source, such as a film transporting motor, near the magnetic head, so that a S/N at the time of reading the film information is not satisfactorily obtained in cooperation with the aforementioned very small signal output.

The signal output V from the magnetic head has the following relationship:

$$V \alpha T_w \times T \times S.$$

Wherein, $T_w$ is a width of the track forming portion of the magnetic head in the perpendicular direction to the film transporting direction, i.e. the core width of the magnetic head; T is the number of coil turns around the core of the magnetic head; S is a film transporting speed.

In order to enlarge the signal output V, it is necessary to enlarge the width of the track $T_w$, to increase the number of coil turns T, or to increase the film transporting speed S.

However, it is difficult to increase the film transporting speed owing to the size of a battery loadable in the camera, that is, owing to the limited electric power available for a film transporting operation.

Increasing the number of coil turns T enlarges the size of the magnetic head, which results in enlarges the size of the camera.

Broadening the width of the track $T_w$ causes the following problem.

It is desirable that a reading track for reading the film information from the film also may be used for the writing to (recording on) the film, whereby the number of the recording tracks is increased, and the photographic information recordable for one film frame is increased. That is, after reading the film information from a track where the information is previously-recorded (when the film information is read from the track, this track is referred to as a "reading track"), it is desirable that to write new information over the previously-recorded information in order to also reuse the reading track as a "recording track", to increase the amount of information for one film frame.

As above-described, the '419 patent discloses increasing the number of the recording tracks in order to increase the amount of the recordable information. However, if the width of the track Tw is broadened, the number of the recording tracks cannot be increased. Therefore, the amount of the recordable information cannot be increased.

SUMMARY OF THE INVENTION

One aspect of the present invention is to provide a camera for use with a film having a magnetic memory portion, or a magnetic head for such a camera, which comprises a first head portion for writing information to the magnetic memory portion of the film, and a second head portion for at last reading information from the magnetic memory portion of the film, wherein a dimension of the second head portion in the perpendicular direction to a film transporting direction is longer than a dimension of the first head portion in the perpendicular direction to the film transporting direction.

Yet another aspect of the present invention is to provide a camera for use with a film with a magnetic memory portion, or a magnetic head for such a camera, which comprises a plurality of head portions for at least one of writing or reading information to or from the magnetic memory portion of the film, wherein one of the head portions, which is the farthest from an edge of a photographic frame of the film of all the head portions, is arranged to be the longest in length of the head portions in a perpendicular direction to a film transporting direction, of all the head portions.

According to these aspects, without enlarging the camera, it is possible to record a sufficient amount of information to the film, and to read or cause the same camera or another camera to read information satisfactorily.

Other aspects of the present invention will become apparent from the following description of the preferred embodiment of the present invention.

DETAILED DESCRIPTION OF THE PREFERRED EMBODIMENT

A preferred embodiment of the present invention will be described with reference to the accompanying drawings.

Figure 1:
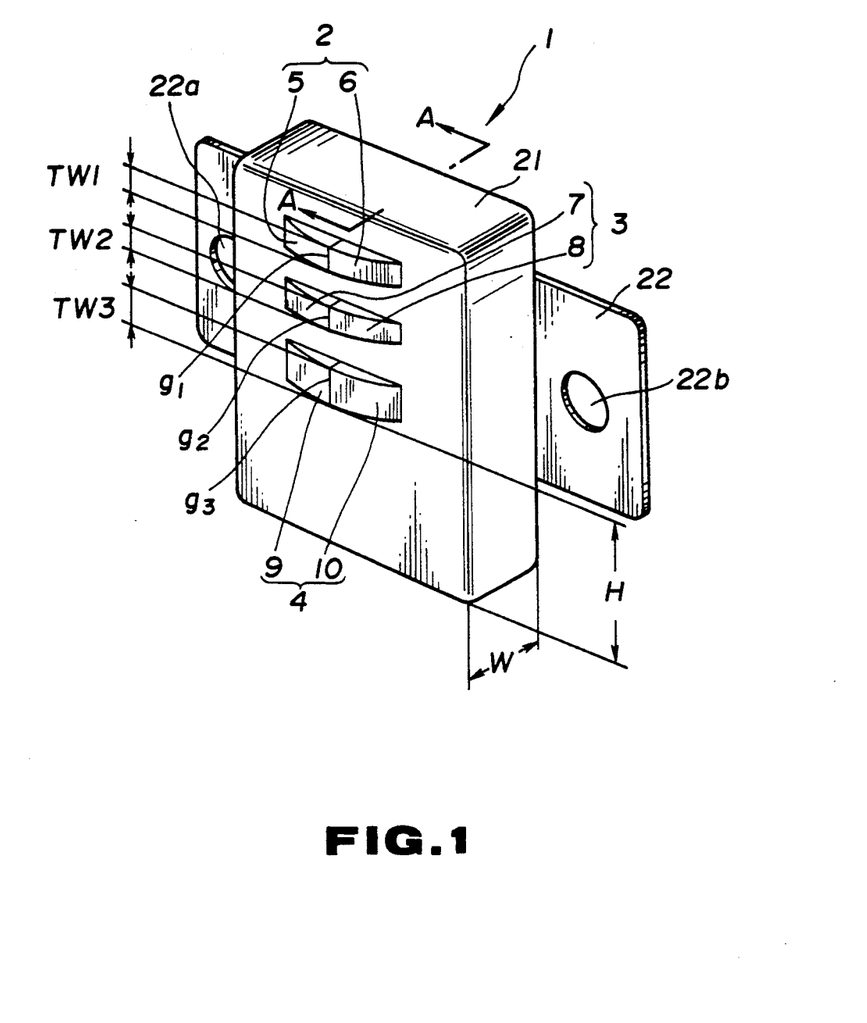
FIG. 1 is a perspective view of a magnetic head for a camera in accordance with a preferred embodiment of the present invention.
Figure 2:
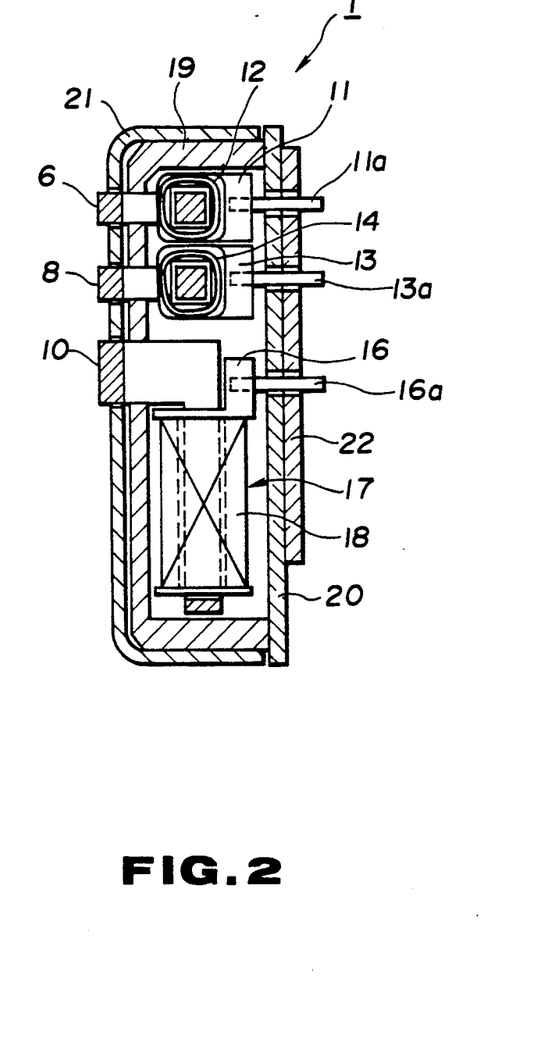
FIG. 2 is a cross-sectional view taken along the line A—A of FIG. 1.
Figure 3:
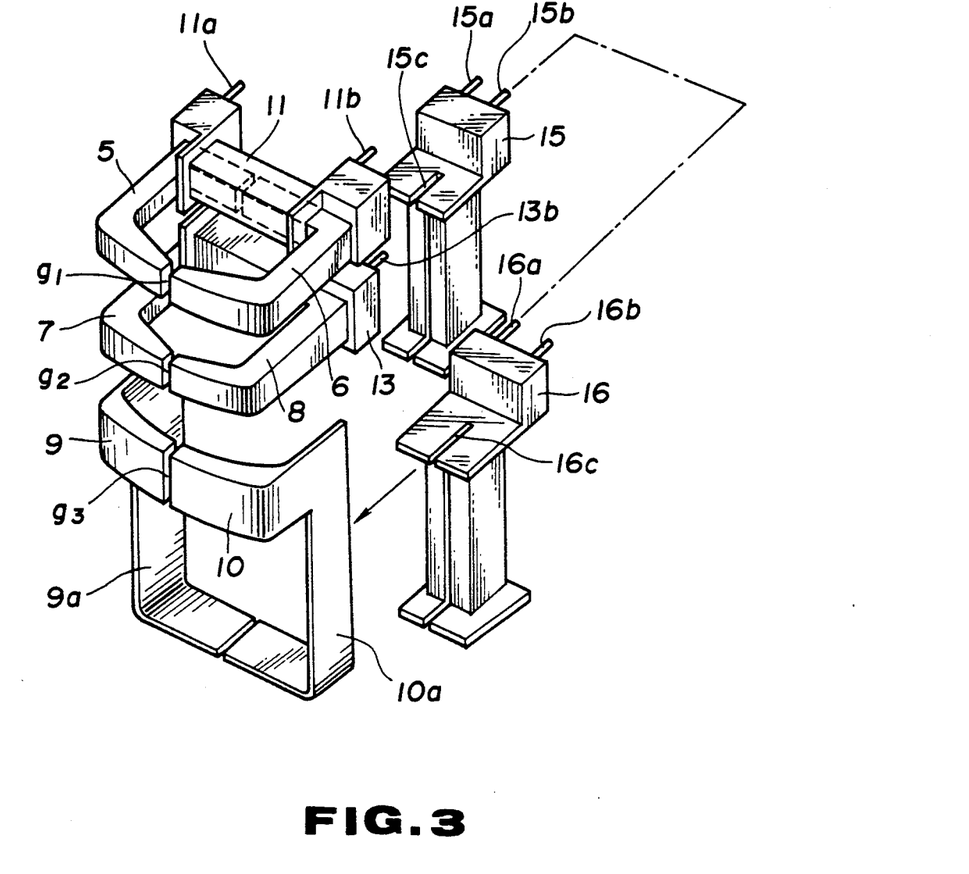
FIG. 3 is an exploded perspective view showing components of the magnetic head shown in FIG. 1.

Referring to FIG. 1, FIG. 2 and FIG. 3, reference numeral 1 denotes a magnetic head; reference numerals 2, 3 and 4 denotes first, second and third track forming portions, respectively.

The first, second and third track forming portions 2, 3 and 4, respectively form individual recording tracks on a magnetic memory portion of a film (merely referred to as a "film" below), that is, the aforementioned magnetic layer of the film, respectively, wherein the first and the second track forming portions 2 and 3 are only used for recording magnetic information to the film. The third track forming portion 4 is used not only for the recording magnetic information on the film but also for reading magnetic information from the film. The relationship of widths among the respective track forming portions 2, 3 and 4 is "Tw1=Tw2<Tw3."

The first track forming portion 2 includes two cores 5 and 6 which are made of material having high permeability and high saturation flux density, such as permalloy, and are positioned to form a magnetic gap g1. In the same way, the second track forming portion 3 includes two cores 7 and 8 which are made of material, such as permalloy, and are held to form a magnetic gap g2. The third track forming portion 4 includes two cores 9 and 10 which are made of material, such as permalloy, and are positioned to form a magnetic gap g3.

The aforementioned cores 5 and 7, and 6 and 8 are of the same shape, and the first track forming portion 2 and the second track forming portion 3 are similarly made.

Reference numeral 11 denotes a bobbin for the first track forming portion 2 around which a coil 12 is wound. The two ends of the coil 12 are connected to terminals 11a and 11b of the bobbin 11, respectively. After that, the cores 5 and 6 are fitted into the bobbin 11 as shown in FIG. 3. Electricity is intermittently supplied to the coil 12 through the bobbin terminals 11a and 11b from the camera, whereby magnetically recording on the film is performed through the magnetic gap g1.

Reference numeral 13 denotes a bobbin for the second track forming portion 3; 13a and 13b, terminals of the bobbin 13; 14, a coil. These components are all similar to their counterpart components used for the first track forming portion 2.

The aforementioned first and second track forming portions 2 and 3 are only used for recording. Accordingly, the widths Tw1 and Tw2 thereof may be small, and the number of turns of coils 12 and 14 may be relatively few. Reference numerals 15 and 16 denote two bobbins, wherein the bobbin 15 is fitted to the core 9 in such a manner that a slit 15c of the bobbin 15 is fitted to a straight portion 9a of the core 9, and the bobbin 16 is fitted to the core 10 in such a manner that a slit 16c of the bobbin 16 is fitted to a straight portion 10a of the core 10, and then coils 17 (not shown) and 18 (see FIG. 2) are wound around the bobbins 15 and 16, respectively.

Furthermore, both ends of coil 17 are connected to terminals 15a and 15b of the bobbin 15, respectively, both terminals of coil 18 are connected to terminals 16a and 16b of the bobbin 16, respectively, and the bobbin terminals 15b and 16a are connected to each other.

Therefore, recording on the film by means of the third track forming potion 4 is performed through magnetic gap g3, by means of the coils 17 and 18 which are connected in series through the bobbin terminals 15a and 16b from the camera, and to which electricity is intermittently supplied. On the other hand, regarding reading information from the film, a magnetic flux change in the cores 9 and 10 caused by the film traveling at the magnetic gap g3 is electromagnetically-transformed by means of the coils 17 and 18 connected in series, to be transmitted as an electric signal through the bobbin terminals 15a and 16b to the camera.

The third track forming portion 4 requires enlarging the width Tw3 and increasing the number T of turns of the coils 17 and 18 because the third track forming portion 4 is used not only for recording information to the film but also for reading information from the film.

In this embodiment, the width Tw3 is easy to enlarge by making the cores 9 and 10 bent workpieces, and large spaces for winding the coils 17 and 18 are secured by forming the straight portions 9a and 10a. Moreover, a sufficient number of coil turns to read information from the film is achieved by means of the structure in which coils 17 and 18 are connected in series. The manner of providing the spaces for winding the coils 17 and 18 must be such that a thickness W of the magnetic head 1 (see FIG. 1) is not enlarged.

Reference numeral 19 denotes a core support which holds at predetermined positions the cores 5 and 6 integrated with the bobbin 11, the cores 7 and 8 integrated with the bobbin 13 and the cores 9 and 10 respectively integrated with the bobbins 15 and 16; 20, a base board constructing a housing for the magnetic head 1 together with the core support 19; 21, a shielding case, which is made of permalloy, etc., for reducing an influence of external magnetic noise; 22, an installation board for installing the magnetic head 1 in the camera, having two holes 22a and 22b for installation purposes.

Figure 4:
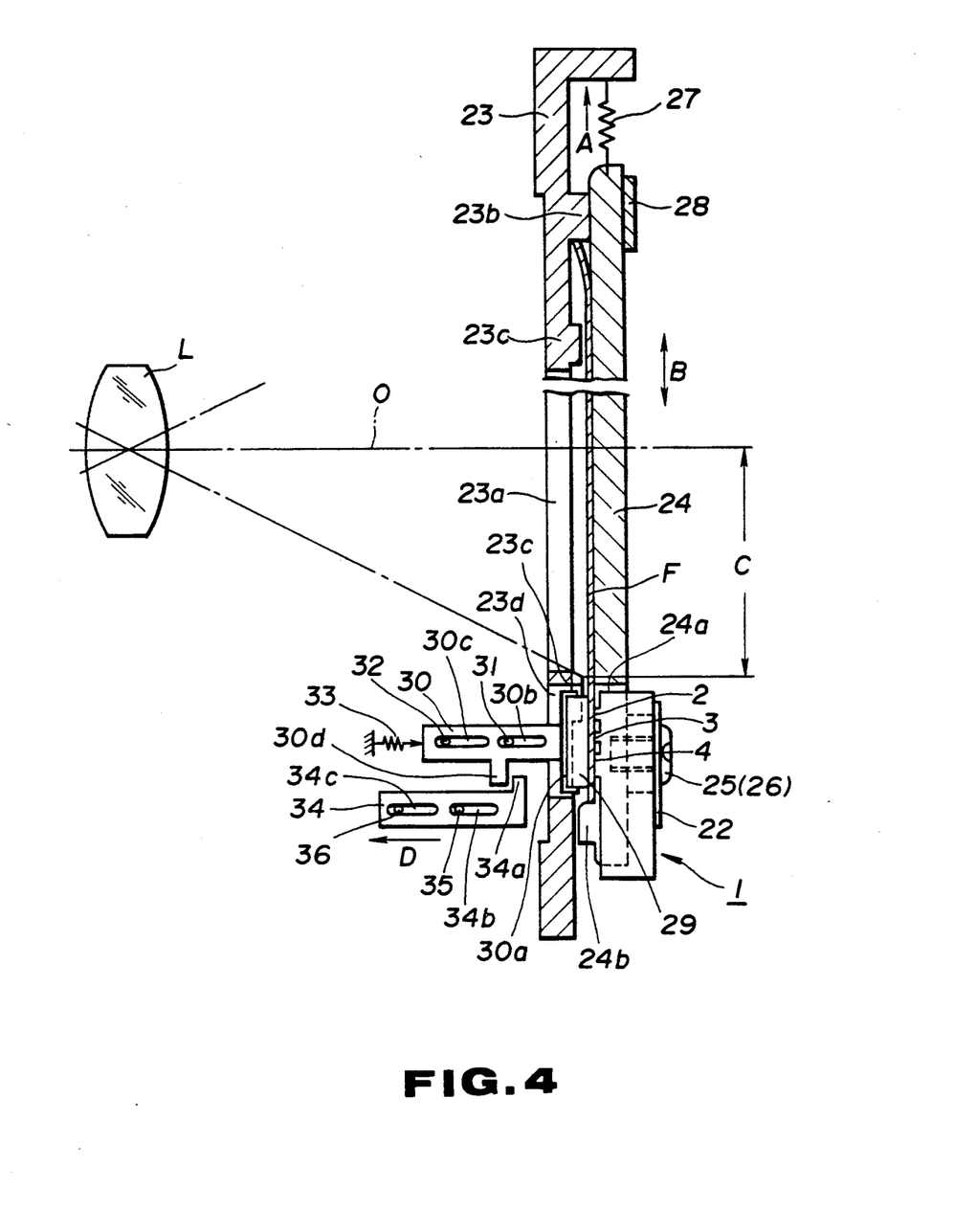
FIG. 4 is a horizontal cross-sectional view of the magnetic head of FIG. 1 positioned in a camera.

FIG. 4 is a horizontal cross-sectional view showing the aforementioned magnetic head 1 wherein reference numeral 23 denotes a camera body having a well-known aperture 23a, an up-and-down pair of outer rails 23b (although the outer rails 23b are provided in a pairs aligned up and down a photographic optical axis, the lower outer rails of the pair of outer rails 23b is cut away and not shown in FIG. 4), and an up-and-down pair of inner rails 23c; 24, a pressure plate abutting to the outer rails 23b; F, the aforementioned film with the magnetic memory portion, which is transported through the space formed by the outer rails 23b, the inner rails 23c and the pressure plate 24, and is stopped and exposed.

The magnetic head 1 is fixed to the pressure plate 24 with the installation holes 22a and 22b of the installation board 22 and screws 25 and 26 (not shown). Thus, the first, the second and third track forming portions 2, 3 and 4 is positioned at the place which the magnetic head passes, through the cut-off portion 24a of the pressure plate 24.

Reference numeral 27 denotes an extension spring for urging the pressure plate 24 in the direction of an arrow A in such a manner that a projection 24b of the pressure plate constantly abuts to the lower edge of the film F even if the film F travels with an up and down wave-like motion (in the direction of an arrow B) between a pair of the outer rails 23b. Reference numeral 28 denotes a guide member for guiding the movement of the pressure plate 24 in the direction of the arrow B, with a space formed between the guide member 28 and the outer rails 23b. This structure is provided to continuously keep constant the distances from the lower edge of the film to the first, the second and the third track forming portions 2, 3 and 4; i.e. to secure the positional accuracy of the recording tracks on the film.

Additionally, the first, the second and the third track forming portions 2, 3 and 4 are arranged outside the photographic frame portions of the film defined by a photographic lens L (denoted as C in FIG. 4).

In this embodiment, the third track forming portion 4, which is used not only for writing information to the film but also for reading information from the film, is positioned farthest from the photographic frame portion. The reason for such positioning is that it is more convenient to provide the space for securing the number of coil turns in the direction of H in FIG. 1, in order to materialize the space for securing the number of coil turns without increasing a thickness W of the magnetic head 1. If the aforementioned third trackforming portion 4 is provided on the near side of the photographic frame portion, it causes an inconvenience of harming the flatness of the film in the photographic frame, to cause the image quality of the photography to deteriorate. The reason is that the coils 17 and 18 must be extended upwards to extend the cut-off portions 24a of the pressure plate 24 in the direction of the photographic frame portion.

On the other hand, it is not good to provide the space for the coil turns in the direction of the thickness W of the magnetic head 1, because this causes the thickness of the camera to become enlarged.

Reference numeral 29 denotes a pad made of an elastic member and fixed to a reception portion 30a of a lever 30. The lever 30 has elongated holes 30b and 30c respectively, pins 31 and 32 fixed to the camera body 23, to be movable right and left in FIG. 4. Reference numeral 30d denotes an engagement portion for engaging with a later-described lever 34. Reference numeral 33 denotes a spring for urging the lever 30 to the right in FIG. 4. The film F during a transporting operation is constantly pressed to the first, the second and the third track forming portions 2, 3, and 4 by means of the pad 29 and the urging force of the spring 33. Therefore, it is possible to satisfactorily read and write information from or to the film.

Reference numeral 34 denotes the aforementioned lever, which is movable right and left in FIG. 4 by using elongated holes 34b and 34c and pins 35 and 36, and which drives the lever 30 in the direction of arrow D by means of engagement portions 34a and 30d when the lever 34 is driven in the direction of the arrow D by an unillustrated means. As a result, the state where the pad 29 presses the film F to the magnetic head 1 is released. This released state is desirable when reading or writing information from or to the film is not being performed. Consequently, the film F is prevented from being deformed owing to pressing the film F to the magnetic head 1 for a long time and the flatness of the film F is prevented from being affected by the pad 29 when an exposure operation is performed.

Figure 5:
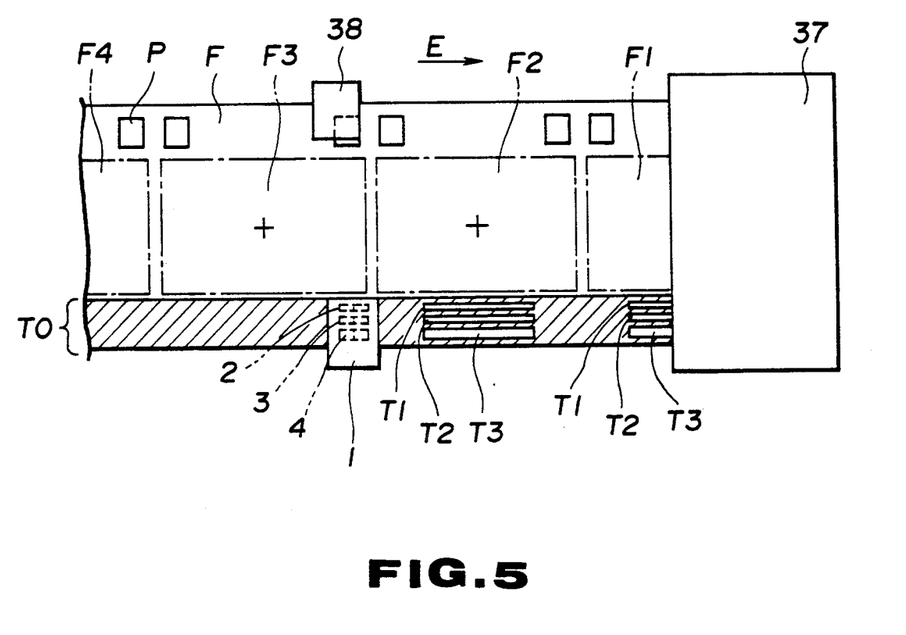
FIG. 5 is a diagram showing a state of magnetically recording with using the magnetic head of FIG. 1.

FIG. 5 is a diagram showing a state of magnetically writing to the film F, wherein reference character 37 denotes a film cartridge; 38, a photodetector of the camera; F1 through F4, photographic frames, wherein F1 and F2 are exposed photographic frames and F3 and F4 are unexposed frames; T0, a film information track previously-recorded on the magnetic memory portion of the film; T1 through T3, photographic information tracks corresponding to each photographic frame, which are recorded over to the film information track T0 for film information on the film information track by means of the first, the second and the third track forming portions 2, 3 and 4 of the magnetic head 1.

The example of FIG. 5 applies to a so-called pre-wind camera.

The film cartridge 37 is loaded in a cartridge chamber of the camera, the film F is pushed out by an unillustrated fork of the camera, and all of the film F is wound around a take-up spool in advance. Meanwhile, i.e. while the film F is continuously transported in the opposite direction to an arrow E, the aforementioned film information, i.e. the film speed, the specified number of photographic frames, etc., on the film information track T0 is read out by the third track forming portion 4 of the magnetic head 1. Because, as previously stated, the third track forming portion has sufficient width Tw3 and a sufficient number of coil turns T, reading of the information is satisfactorily performed.

When the pre-winding operation is completed, the film F is transported in the direction of the arrow E, and when the first frame for an exposure reaches the position of the aperture of the camera, the film is stopped in response to the photodetector 38 detecting a perforation. When a shutter button press operation is performed and a photographic operation is completed, the film F is transported in the direction of the arrow E by one frame. During this one frame transportation, the photographic information pertaining to a shutter time, etc., at the time of the photographic operation, is written to the photographic information tracks T1, T2 and T3 by means of the first, second and third track forming portions 2, 3 and 4, respectively of the magnetic head 1. The foregoing type of recording is known as saturation-type recording, wherein the film information on the film information track T0 is erased at the same time the photographic information is recorded. Subsequently, in the same way, the photographic operation is continued.

In the embodiment of FIG. 5, regarding the exposed photographic frames F1 and F2, the photographic information is recorded on the photographic information tracks T1, T2 and T3, and regarding the unexposed frames F3 and F4, the film information remains in complete state on the film information track T0.

In this embodiment, three recording tracks are secured outside the photographic frame by combining the photographic information tracks T1 and T2 having relatively small widths and the photographic information track T3 having a large width. Therefore, photographic information is distributed among the photographic information tracks T1, T2 and T3 in response to the kinds of the photographic information such as a date and a time of a photographing operation is written to the photographic information track T1; a shutter time and an aperture value, is written to the photographic information track T2; pseudo-zoom information, the kind of illuminating light source, a luminance and exposed information, is written to the photographic information track T3. As a result, a large amount of information can be written to the film.

The photographic information recorded on the photographic information tracks T1, T2 and T3 by the camera (the magnetic head 1) is, at the stages of development and printing, read out by a magnetic head arranged in a development device or a printing device, and used for typing out the date, the photographic information pertaining to the shutter time, etc., to a print, or for making a zoom-print based on the pseudo-zoom information. It may be a concern that when the photographic information is read out by the development device or the printing device, signal outputs from the photographic information tracks T1 and T2 are small because the track widths thereof are narrow. However, it does not cause any problems, because the development device or the printing device, which is different from a small-sized device like the camera, can transport the film at a high speed, can keep an electromagnetic noise source, such as a film transporting motor, sufficiently from the magnetic head, and can house the magnetic head that is large enough to secure the required number of coil turns.

The exposed information, which is recorded together with the photographic information, pertaining to the shutter time, etc., during the film winding operation after the completion of the photographing operation, and which is read out by the same camera or a different camera having the aforementioned "auto set function at the time of reloading the film", is recorded by means of the third track forming portion 4, that is, is recorded on the photographic information track T3 having a large width. The object is to enable the exposed information to be satisfactorily read out. For this reason, even in the case of a camera which can only write information to the film, since information recorded on the film may be read out by a different camera, it is necessary that the width (in the perpendicular direction to the film transporting direction) of the track forming portion of the magnetic head which is the farthest from an edge of the photographic frame, which is advantageous to reading out information, is enlarged.

According to this embodiment, the first, second and third track forming portions 2, 3 and 4 are provided. One of them, that is, the third track forming portion 4 is used not only for recording information but also for reading information, and the third track forming portion 4 is arranged to be the farthest from an edge of the photographic frame and also has the large width in the perpendicular direction to the film transporting direction. Therefore, without enlarging the magnetic head 1, that is, without enlarging the camera, a large amount of information can be recorded in the limited recording area outside the photographic frame, and also reading information can be satisfactorily performed.

Moreover, as above-described, even if the third track forming portion 4 is not used for reading information, but the first, second and third track forming portions 2, 3 and 4 are all only used for recording information, since, for example, the exposed information may be read out by the camera having the "auto-set function at the time of reloading the film feature", enlarging the width (in the perpendicular direction to the film transporting direction) of the track forming portion of the magnetic head the farthest from the photographic frame can obtain similar effects, that is, without engaging the camera, recording a large amount of information in the limited recording area outside the photographic frame and also causing the different camera to satisfactorily read out information.

In this embodiment, the third track forming portion 4 is used not only for writing information but also for reading information, and also has the large width Tw3 in the perpendicular direction to the film transporting direction. However, the present invention is not limited to this. That is, only arranging the third track forming portion 4 the farthest from an edge of the photographic frame causes an effect of being capable of preventing the camera from enlarging. Otherwise, only enlarging the width of third track forming portion 4, in the perpendicular direction to the film transporting direction causes an effect of writing a large amount of information in the limited recording area outside the photographic frame, and an effect of satisfactorily reading out information.

While the present invention has been described with respect to what is presently considered to be the preferred embodiment, it is understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetic head for a camera for use with a film having a magnetic memory portion, comprising:
   a first head portion for writing information to the magnetic memory portion of the film;
   a second head portion for at least reading information from the magnetic memory portion of the film;
   wherein a dimension of said second head portion in a direction perpendicular to a film transporting direction is longer than a dimension of said first head portion in the direction perpendicular to the film transporting direction.

2. A magnetic head, according to claim 1, wherein said second head portion comprises means for writing information to the magnetic memory portion of the film.

3. A magnetic head according to claim 1, wherein said first head portion is arranged so as not to read information from the magnetic memory portion of the film.

4. A magnetic head according to claim 2, wherein said first head portion is arranged so as not to read information from the magnetic memory portion of the film.

5. A magnetic head according to claim 1, wherein said second head portion comprises means for writing information which may be read by at least one of the same camera and another camera.

6. A magnetic head according to claim 1, wherein said second head portion comprises means for writing information which may be read when the film is reused.

7. A magnetic head according to claim 1, wherein said first head portion and said second head portion are arranged to act on separate portions of the magnetic memory portion of the film.

8. A magnetic head for a camera for use with a film having a magnetic memory portion, said head comprising:
   a plurality of head portions for at least one of writing information to and reading information from the magnetic memory portion of the film;
   wherein one of said head portions, which is the farthest of all of said head portions from a photographic area of the film, is shaped to have a length in a direction perpendicular to a film transporting direction that is longer than a length, in the same direction, of at least one of the other of said head portions.

9. A magnetic head according to claim 8, wherein said one of said head portions comprises means for writing information to the magnetic memory portion of the film.

10. A magnetic head according to claim 8, wherein said one of the other of said head portions is arranged so as not to read information from the magnetic memory portion of the film.

11. A magnetic head according to claim 9, wherein said one of the other of said head portions is arranged so as not to read information from the magnetic memory portion of the film.

12. A magnetic head according to claim 8, wherein said one of said head portions and said one of the other of said head portions are arranged to act on separate portions of the magnetic memory portion of the film.

13. A magnetic head according to claim 8, wherein said one of said head portions is shaped to have a length in the direction perpendicular to the film transporting direction that is longer than a length, in the same direction, of any of the other of said plurality of head portions.

14. A camera for use with a film having a magnetic memory portion, comprising:
   a first head portion for writing information to the magnetic memory portion of the film;
   a second head portion for at least reading information from the magnetic memory portion of the film;
   wherein a dimension of said second head portion in a direction perpendicular to a film transporting direction is longer than a dimension of said first head portion in the direction perpendicular to the film transporting direction.

15. A camera according to claim 14, wherein said second head portion comprises means for writing information to the magnetic memory portion of the film.

16. A camera according to claim 14, wherein said first head portion is arranged so as not to read information from the magnetic memory portion of the film.

17. A camera according to claim 15, wherein said first head portion is arranged so as not to read information from the magnetic memory portion of the film.

18. A camera according to claim 14, wherein said second head portion comprises means for writing information which may be read by at least one of the same camera and another camera.

19. A camera according to claim 14, wherein said second head portion comprises means for writing information which may be read when the film is reused.

20. A camera according to claim 14, wherein said first head portion and said second head portion are arranged to act on separate portions of the magnetic memory portion of the film.

21. A camera for use with a film having a magnetic memory portion, said camera comprising:
   a plurality of head portions for at least one of writing information to and reading information from the magnetic memory portion of the film;
   wherein one of said head portions, which is the farthest of all of said head portions from a photographic area of the film, is shaped to have a length in a direction perpendicular to a film transporting direction that is longer than a length, in the same direction, of at least one of the other of said head portions.

22. A magnetic head according to claim 21, wherein said one of said head portions comprises means for writing information to the magnetic memory portion of the film.

23. A camera according to claim 21, wherein said one of the other of said head portions is arranged so as not to read information from the magnetic memory portion of the film.

24. A camera according to claim 22, wherein said one of the other of said head portions is arranged so as not to read information from the magnetic memory portion of the film.

25. A camera according to claim 21, wherein said one of said head portions and said one of the other of said head portions area arranged to act on separate portions of the magnetic memory portion of the film.

26. A camera according to claim 21, wherein said one of said head portions is shaped to have a length in the direction perpendicular to the film transporting direction that is longer than a length, in the same direction, of any of the other of said head portions.

27. A magnetic head for a camera for use with a film having a magnetic memory portion, said head comprising:
  a plurality of head portions for at least one of writing information to and reading information from the magnetic memory portion of the film,
  wherein at least one of said head portions for at least reading information from the magnetic memory portion of the film is shaped to have a length in a direction perpendicular to a film transporting direction that is longer than a length, in the same direction, of at least one of said head portions for at least writing information to the magnetic memory portion of the film.

28. A magnetic head according to claim 27, wherein said one of said head portions for at least reading information comprises means for writing information to the magnetic memory portion of the film.

29. A magnetic head according to claim 28, wherein said one of said head portions for at least writing information is arranged so as not to read information from the magnetic memory portion of the film.

30. A magnetic head according to claim 27, wherein said one of said head portions for at least writing information is arranged so as not to read information from the magnetic memory portion of the film.

31. A magnetic head according to claim 27, wherein said one of said head portions for at least reading information comprises means for writing information which may be read by at least one of the same camera and another camera.

32. A magnetic head according to claim 27, wherein said one of said head portions for at least reading information comprises means for writing information which may be read when the film is reused.

33. A magnetic head according to claim 27, wherein all of the other of said heat portions are arranged so as not to read information from the magnetic memory portion of the film.

34. A magnetic head according to claim 33, wherein said one of said head portions is shaped to have a length in the direction perpendicular to the film transporting direction that is longer than a length, in the same direction, of any of the other of said head portions.

35. A magnetic head according to claim 27, wherein said one of said head portions is shaped to have a length in the direction perpendicular to the film transporting direction that is longer than a length, in the same direction, of any of the other of said head portions.

36. A magnetic head for a camera for use with a film having a magnetic memory portion, said head comprising:
  a first head portion for at least one of writing information to and reading information from the magnetic memory portion of the film; and
  a second head portion for at least one of writing information to and reading information from the magnetic memory portion of the film;
  wherein a dimension of said second head portion in a direction perpendicular to a film transporting direction is larger than a dimension, in the same direction, of said first head portion, and said second head portion is farther from a photographic area of the film than said first head portion.

37. A magnetic head according to claim 36, wherein said second head portion comprises means for writing information to the magnetic memory portion of the film.

38. A magnetic head according to claim 37, wherein said first head portion is arranged so as not to read information from the magnetic memory portion of the film.

39. A magnetic head according to claim 36, wherein said first head portion is arranged so as not to read information from the magnetic memory portion of the film.

40. A magnetic head according to claim 36, wherein said first head portion and said second head portion area arranged to act on separate portions of the magnetic memory portion of the film.

41. A magnetic head for a camera for use with a film having a magnetic memory portion, said head comprising:
  a first head portion for at least one of writing information to and reading information from the magnetic memory portion of the film; and
  a second head portion for at least one of writing information to and reading information from the magnetic memory portion of the film; and
  a second head portion for at least one of writing information to and reading information from the magnetic memory portion of the film; and
  wherein a dimension of said second head portion in a direction perpendicular to a film transporting direction is larger than a dimension, in the same direction, of said first head portion, and said first head portion and said second head portion are arranged to act on separate portions of the magnetic memory portion of the film.

42. A magnetic head according to claim 41, wherein said second head portion comprises means for writing information to the magnetic memory portion of the film.

43. A magnetic head according to claim 42, wherein said first head portion is arranged so as not to read information from the magnetic memory portion of the film.

44. A magnetic head according to claim 41, wherein said first head portion is arranged so as not to read information from the magnetic memory portion of the film.

45. A magnetic head according to claim 41, wherein said second head portion comprises means for writing information which may be read by at least one of the same camera and another camera.

46. A magnetic head according to claim 41, wherein said second head portion comprises means for writing information which may be read when the film is reused.

47. A magnetic head for a camera for use with a film having a magnetic memory portion, said head comprising:
  a plurality of head portions for at least one of writing information to and reading information from the magnetic memory portion of the film;
  wherein at least one of said head portions is shaped to have a length in a direction perpendicular to a film transporting direction that is longer than a length, in the same direction, of at least one of the other of said head portions, and said one of said head portions and said one of the other of said head portions are arranged to act on separate portions of the magnetic memory portion of the film.

48. A magnetic head according to claim 47, wherein said one of said plurality of head portions comprises means for writing information to the magnetic memory portion of the film.

49. A magnetic head according to claim 48, wherein said one of the other of said plurality of head portions is arranged so as not to read information from the magnetic memory portion of the film.

50. A magnetic head according to claim 47, wherein said one of the other of said head portions is arranged so as not to read information from the magnetic memory portion of the film.

51. A magnetic head according to claim 47, wherein said one of said head portions comprises means for writing information which may be read by at least one of the same camera and another camera.

52. A magnetic head according to claim 47, wherein said one of said head portions comprises means for writing information which may be read when the film is reused.

53. A magnetic head according to claim 47, wherein said one of said head portions is shaped to have a length in the direction perpendicular to the film transporting direction that is longer than a length, in the same direction, of any of the other of said head portions.

54. A magnetic head for a camera for use with a film having a magnetic memory portion, said head comprising:
   a first head portion for at least writing information to the magnetic memory portion of the film; and
   a second head portion for at least writing, to the magnetic memory portion of the film, information that may be read by at least one of the same camera and another camera;
   wherein a dimension of said second head portion in a direction perpendicular to a film transporting direction is larger than a dimension, in the same direction, of said first head portion.

55. A magnetic head according to claim 54, wherein said first head portion is arranged so as not to read information from the magnetic memory portion of the film.

56. A magnetic head for a camera for use with a film having a magnetic memory portion, said head comprising:
   a plurality of head portions for at least writing information to the magnetic memory portion of the film;
   wherein at leas one of said head portions is shaped to have a length in a direction perpendicular to a film transporting direction that is longer than a length, in the same direction, of at least one of the other of said head portions, and said one of said head portions writes information which may be read by at least one of the same camera and another camera.

57. A magnetic head according to claim 56, wherein said one of the other of said head portions is arranged so as not to read information from the magnetic memory portion of the film.

58. A magnetic head according to claim 56, wherein all of the other of said head portion are arranged so as not to read information from the magnetic memory portion of the film.

59. A magnetic head according to claim 58, wherein said one of said head portions is shaped to have a length in the direction perpendicular to the film transporting direction that is longer than a length, in the same direction, of any of the other of said head portions.

60. A magnetic head according to claim 56, wherein said one of said head portions is shaped to have a length in the direction perpendicular to the film transporting direction that is longer than a length, in the same direction, of any of the other of said head portions.

61. A magnetic head for a camera for use with a film having a magnetic memory portion; said head comprising:
   a first head portion for at least writing information to the magnetic memory portion of the film; and
   a second head portion for at least writing, to the magnetic memory portion of the film, information that may be read when the film is reused;
   wherein a dimension of said second head portion in a direction perpendicular to a film transporting direction is larger than a dimension, in the same direction, of said first head portion.

62. A magnetic head according to claim 61, wherein said first head portion is arranged so as not to read information from the magnetic memory portion of the film.

63. A magnetic head for a camera for use with a film having a magnetic memory portion, said head comprising:
   a plurality of head portions for at least writing information to the magnetic memory portion of the film;
   wherein at least one of said head portions is shaped to have a length in a direction perpendicular to a film transporting direction that is longer than a length, in the same direction, of at least one of the other of said head portions, and said one of said head portions writes information which may be read when the film is reused.

64. A magnetic head according to claim 63, wherein said one of the other of said plurality of head portions is arranged so as not to read information from the magnetic memory portion of the film.

65. A magnetic head according to claim 63, wherein all of the other of said head portions are arranged so as not to read information from the magnetic memory portion of the film.

66. A magnetic head according to claim 65, wherein said one of said head portions is shaped to have a length in the direction perpendicular to the film transporting direction that is longer than a length, in the same direction, of any of the other of said head portions.

67. A magnetic head according to claim 63, wherein said one of said head portion is shaped to have a length in the direction perpendicular to the film transporting direction that is longer than a length, in the same direction, of any of the other of said head portions.

68. A magnetic head according to claim 64, wherein said one of said head portions is shaped to have a length in the direction perpendicular to the film transporting direction that is longer than a length, in the same direction, of any of the other of said plurality of head portions.

69. An information transmission head for a camera for use with an image recording medium having a memory portion, said head comprising:
   a first head portion for at least writing information to the memory portion on one side of an image recording area of the image recording medium; and
   a second head portion for at least reading information from the memory portion on the one side of the image recording area;
   wherein a dimension of said second head portion in a direction perpendicular to an image recording area transporting direction is larger than a dimension, in the same direction, of said first head portion.

70. An information transmission head for a camera for use with an image recording medium having a memory portion, said head comprising:

a plurality of head portions for at least one writing information to and reading information from the memory portion on one side of an image recording area of the image recording medium;

wherein at least one of said head portions for at least reading information form the memory portion on the one side of the image recording area is shaped to have a length in a direction perpendicular to an image recording area transporting direction that is longer than a length, in the same direction, of at least one of said head portions for at least writing information to the memory portion on the one side of the image recording area.

71. An information transmission head for a camera for use with an image recording medium having a memory portion, said head comprising:

a first head portion for at least one of writing information to and reading information from the memory portion on one side of an image recording area of the image recording medium; and a second head portion for at least one of writing information to and reading information from the memory portion on the one side of the image recording medium;

wherein a dimension of said second head portion in a direction perpendicular to an image recording area transporting direction is larger than a dimension, in the same direction, of said first head portion, and said second head portion is farther from the image recording area than said first head portion.

72. An information transmission head for a camera for use with an image recording medium having a memory portion, said head comprising:

a plurality of head portions for at least one of writing information to and reading information from the memory portion on one side of an image recording area of the image recording medium;

wherein at least one of said head portions, which is the farthest of all of said head portions from the image recording area, is shaped to have a length in a direction perpendicular to an image recording area transporting direction that is longer than a length, in the same direction, of at least one of the other of said head portions.

73. An information transmission head for a camera for use with an image recording medium having a memory portion, said head comprising:

a first head portion for at least one of writing information to and reading information from the memory portion on one side of an image recording area of the image recording medium; and a second head portion for at least one of writing information to and reading information from the memory portion on the one side of the image recording area;

wherein a dimension of said second head portion in a direction perpendicular to an image recording area transporting direction is larger than a dimension, in the same direction, of said first head portion, and said first head portion and said second head portion are arranged to act on separate portions of the memory portion on the one side of the image recording area.

74. An information transmission head for a camera for use with an image recording medium having a memory portion, said head comprising:

a plurality of head portions for at least one of writing information to and reading information from the memory portion on one side of an image recording area of the image recording medium;

wherein at least one of said head portions is shaped to have a length in a direction perpendicular to an image receiving area transporting direction that is longer than the length, in a same direction, of at least one of the other of said head portions, and said one of said head portions and said one of the other of said head portions are arranged to act on separate portions of the memory portion on the one side of the image recording area.

75. An information transmission head for a camera for use with an image recording medium having a memory portion, said head comprising:

a first head portion for at least writing information to the memory portion on one side of an image recording area of the image recording medium; and a second head portion for at least writing, to the memory portion on the one side of the image recording area information that may be read by at least one of the same camera and another camera;

wherein a dimension of said second head portion in a direction perpendicular to an image recording area transporting direction is larger than a dimension, in the same direction, of said first head portion.

76. An information transmission head for a camera for use with an image recording medium having a memory portion, said head comprising:

a plurality of head portions for at least writing information to the memory portion on one side of an image recording area of the image recording medium;

wherein at least one of said head portions is shaped to have a length in a direction perpendicular to an image recording area transporting direction that is longer than the length, in a same direction, of at least one of the other of said head portions, and said one of said head portions writes information which may be read by at least one of the same camera and another camera.

77. A camera for use with a film having a magnetic memory portion, said camera comprising:

a first head portion for at least one of writing information to and reading information from the magnetic memory portion of the film; and a second head portion for at least one of writing information to and read in information from the magnetic memory portion of the film;

wherein a dimension of said second head portion in a direction perpendicular to a film transporting direction is larger than a dimension, in the same direction, of said first head portion, and said first head portion and said second head portion are arranged to act on separate portions of the magnetic memory portion of the film.

78. A camera according to claim 77, wherein said second head portion comprises means for writing information to the magnetic memory portion of the film.

79. A camera according to claim 78, wherein said first head portion is arranged so as not to read information from the magnetic memory portion of the film.

80. A camera according to claim 77, wherein said first head portion is arranged so as not to read information from the magnetic memory portion of the film.

81. A camera according to claim 77, wherein said second head portion comprises means for writing information which may be read by at least one of the same camera and another camera.

82. A camera according to claim 77, wherein said second head portion comprises means for writing information which may be read when the film is reused.

83. A camera for use with a film having a magnetic memory portion, said camera comprising:
a plurality of head portions for at least one of writing information to and reading information from the magnetic memory portion of the film;
wherein at least one of said head portions is shaped to have a length in a direction perpendicular to a film transporting direction that is longer than a length, in the same direction, of at least one of the other of said head portions, and said one of said head portion and said one of the other of said head portions are arranged to act on separate portions of the magnetic memory portion of the film.

84. A camera according to claim 83, wherein said one of said plurality of head portions comprises means for writing information to the magnetic memory portion of the film.

85. A camera according to claim 84, wherein said one of the other of said plurality of head portions is arranged so as not to read information from the magnetic memory portion of the film.

86. A camera according to claim 83, wherein said one of the other of said head portions is arranged so as not to read information from the magnetic memory portion of the film.

87. A camera according to claim 83, wherein said one of said head portions comprises means for writing information which may be read by at least one of the same camera and another camera.

88. A camera according to claim 83, wherein said one of said head portions comprises means for writing information which may be read when the film is reused.

89. A camera according to claim 83, wherein said one of said head portions is shaped to have a length in the direction perpendicular to the film transporting direction that is longer than a length, in the same direction of any of the other of said head portions.

90. A camera for a camera for use with a film having a magnetic memory portion, said camera comprising:
a first head portion for at least writing information to the magnetic memory portion of the film; and
a second head portion for at least writing, to the magnetic memory portion of the film, information that may be read by at least one of the same camera and another camera;
wherein a dimension of said second head portion in a direction perpendicular to a film transporting direction is larger than a dimension, in the same direction, of said first head portion.

91. A camera according to claim 90, wherein said first head portion is arranged so as not to read information from the magnetic memory portion of the film.

92. A camera for use with a film having a magnetic memory portion, said camera comprising:
a plurality of head portions for at least writing information to the magnetic memory portion of the film;
wherein at least one of said head portions is shaped to have a length in a direction perpendicular to a film transporting direction that is longer than a length, in the same direction, of at least one of the other of said head portions, and said one of said head portions writes information which may be read by at least one of the same camera and another camera.

93. A camera according to claim 92, wherein said one of the other of said head portions is arranged so as not to read information from the magnetic memory portion of the film.

94. A camera according to claim 92, wherein all of the other of said head portions are arranged so as not to read information from the magnetic memory portion of the film.

95. A camera according to claim 94, wherein said one of said head portions is shaped to have a length in the direction perpendicular to the film transporting direction that is longer than the length, in a same direction, of any of the other of said head portions.

96. A camera according to claim 92, wherein said one of said head portions is shaped to have a length in the direction perpendicular to the film transporting direction that is longer than the length, in a same direction, of any of the other of said head portions.

97. A camera for use with a film having a magnetic memory portion; said camera comprising:
a first head portion for at least writing information to the magnetic memory portion of the film; and
a second head portion for at least writing, to the magnetic memory portion of the film, information that may be read when the film is reused;
wherein a dimension of said second head portion in a direction perpendicular to a film transporting direction is larger than a dimension, in the same direction, of said first head portion.

98. A camera according to claim 97, wherein said first head portion is arranged so as not to read information from the magnetic memory portion of the film.

99. A camera for use with a film having a magnetic memory portion, said camera comprising:
a plurality of head portions for at least writing information to the magnetic memory portion of the film;
wherein at least one of said head portions is shaped to have a length in a direction perpendicular to a film transporting direction that is longer than a length, in the same direction, of at least one of the other of said head portions, and said one of said head portions writes information which may be read when the film is reused.

100. A camera according to claim 99, wherein said one of the other of said plurality of head portions is arranged so as not to read information from the magnetic memory portion of the film.

101. A camera according to claim 99, wherein all of the other of said head portions are arranged so as not to read information from the magnetic memory portion of the film.

102. A camera according to claim 101, wherein said one of said head portions is shaped to have a length in the direction perpendicular to the film transporting direction that is longer than a length, in the same direction, of any of the other of said head portions.

103. A camera according to claim 99, wherein said one of said head portions is shaped to have a length in the direction perpendicular to the film transporting direction that is longer than the length, in a same direction, of any of the other of said head portions.

104. A camera according to claim 100, wherein said one of said head portions is shaped to have a length in the direction perpendicular to the film transporting direction that is longer than a length, in the same direction, of any of the other of said plurality of head portions.

105. A camera for use with an image recording medium having a memory portion, said camera comprising:

a first head portion for at least writing information to the memory portion on one side of an image recording area of the image recording medium; and a second head portion for at least reading information from the memory portion of the one side of the image recording area;

wherein a dimension of said second head portion in a direction perpendicular to an image recording area transporting direction is larger than a dimension, in the same direction, of said first head portion.

106. A camera for use with an image recording medium having a memory portion, said camera comprising:

a plurality of head portions for at least one of writing information to and reading information form the memory portion on one side of an image recording area of the image recording medium;

wherein at least one of said head portions for at least reading information from the memory portion on the one side of the image recording area is shaped to have a length in a direction perpendicular to an image recording area transporting direction that is longer than a length, in the same direction, of at least one of said head portions for at least writing information to the memory portion on the one side of the image recording area.

107. A camera for use with an image recording medium having a memory portion, said camera comprising:

a first head portion for at least on of writing information to and reading information from the memory portion on one side of an image recording area of the image recording medium; and a second head portion for at least one of writing information to and reading information from the memory portion on the one side of the image recording medium;

wherein a dimension of said second head portion in a direction perpendicular to an image recording area transporting direction is larger than a dimension, in the same direction, of said first head portion, and said second head portion is farther from the image recording area than said first head portion.

108. A camera for use with an image recording medium having a memory portion, said camera comprising:

a plurality of head portions for at least one of writing information to and reading information from the memory portion on one side of an image recording area of the image recording medium;

wherein at least one of said head portions, which is the farthest of all of said head portions from the image recording area, is shaped to have a length in a direction perpendicular to an image recording area transporting direction that is longer than a length, in the same direction, of at least one of the other of said head portions.

109. A camera for use with an image recording medium having a memory portion, said camera comprising a first head portion for at least one of writing information to and reading information from the memory portion on one side of an image recording area of the image recording medium; and a second head portion for at least one of writing information to and reading information from the memory portion on the one side of the image recording area;

wherein a dimension of said second head portion in a direction perpendicular to an image recording area transporting direction is larger than a dimension, in the same direction, of said first head portion, and said first head portion and said second head portion are arranged to act on separate portions of the memory portion on the one side of the image recording area.

110. A camera for use with an image recording medium having a memory portion, said camera comprising:

a plurality of head portions for at least one of writing information to and reading information from the memory portion on one side of an image recording area of the image recording medium;

wherein at least one of said head portions is shaped to have a length in a direction perpendicular to an image recording area transporting direction that is longer than the length, in a same direction, of at least one of the other of said head portions, and said one of said head portions and said one of the other of said head portions are arranged to act on separate portions of the memory portion on the one side of the image recording area.

111. A camera for use with an image recording medium having a memory portion, said camera comprising:

a first head portion for at least writing information to the memory portion on one side of an image recording area of the image recording medium; and a second head portion for at least writing, to the memory portion on the one side of the image recording area, information that may be read by at least one of the same camera and another camera;

wherein a dimension of said second head portion in a direction perpendicular to an image recording area transporting direction is larger than a dimension, in the same direction, of said first head portion.

112. A camera for use with an image recording medium having a memory portion, said camera comprising:

a plurality of head portions for at least writing information to the memory portion on one side of an image recording area of the image recording medium;

wherein at least one of said head portions is shaped to have a length in a direction perpendicular to an image recording area transporting direction that is longer than the length, in the same direction, of at least one of a other of said head portions, and said one of said head portions writes information which may be read by at least one of the same camera and another camera.

* * * * *

UNITED STATES PATENT AND TRADEMARK OFFICE
CERTIFICATE OF CORRECTION

PATENT NO. : 5,321,452
DATED : June 14, 1994
INVENTOR(S) : SHINICHI TSUJIMOTO

It is certified that error appears in the above-indentified patent and that said Letters Patent is hereby corrected as shown below:

ON COVER PAGE:

At [56] Under Heading "U.S. PATENT DOCUMENTS":
    After the heading "U.S. PATENT DOCUMENTS", insert the following new lines:
```
  --4,977,419   12/90   Wash et al.
    4,878,075   10/89   Cannon
    4,774,534    9/88   Kazumi et al.--.
```

COLUMN 4:
    Line 1, "the" (first occurrence) should read --for--;
    Line 40, "t" should read --to--;
    Line 41, "o" should be deleted; and
    Line 60, "electromagnetically-trans-" should read --electromagnetically trans- --.

COLUMN 10:
    Line 62, "area" should read --are--.

COLUMN 12:
    Line 21, "and" should be deleted; and
    Lines 22-24, should be deleted.

UNITED STATES PATENT AND TRADEMARK OFFICE
CERTIFICATE OF CORRECTION

PATENT NO. : 5,321,452
DATED : June 14, 1994
INVENTOR(S) : SHINICHI TSUJIMOTO

Page 2 of 3

It is certified that error appears in the above-indentified patent and that said Letters Patent is hereby corrected as shown below:

COLUMN 13:
    Line 44, "leas" should read --least--.

COLUMN 14:
    Line 43, "portion" should read --portions--.

COLUMN 15:
    Line 1, "one" should read --one of--.

COLUMN 16:
    Line 5, "receiving" should read --recording--;
    Line 6, "the" should read --a--; and "a" should read --the--;
    Line 20, "area" should read --area,--;
    Line 36, "the" should read --a--; and "a" should read --the--; and
    Line 47, "read in" should read --reading--.

COLUMN 17:
    Line 14, "tion" should read --tions--; and
    Line 39, "length," should read --length--.

COLUMN 18:
    Line 10, "the" should read --a--; and "a" should read --the--;
    Line 15, "the" should read --a--; and "a" should read --the--; and
    Line 58, "the" should read --a--; and "a" should read --the--.

UNITED STATES PATENT AND TRADEMARK OFFICE
CERTIFICATE OF CORRECTION

PATENT NO. : 5,321,452
DATED : June 14, 1994
INVENTOR(S) : SHINICHI TSUJIMOTO

It is certified that error appears in the above-indentified patent and that said Letters Patent is hereby corrected as shown below:

COLUMN 19:
    Line 5, "of" (first occurrence) should read --on--;
    Line 15, "form" should read --from--; and
    Line 59, "comprising" should read --comprising:--.

COLUMN 20:
    Line 25, "the" (first occurrence) should read --a--; and "a" should read --the--;
    Line 56, "the" (first occurrence) should read --a--; and
    Line 57, "a" should read --the--.

Signed and Sealed this

Twenty-ninth Day of November, 1994

Attest:

BRUCE LEHMAN

*Attesting Officer*     *Commissioner of Patents and Trademarks*